(12) United States Patent
Egami et al.

(10) Patent No.: US 8,449,200 B2
(45) Date of Patent: May 28, 2013

(54) RESIN COMPOSITION FOR SLIDING MEMBER AND ROLLING BEARING

(75) Inventors: Masaki Egami, Kuwana (JP); Yoji Sato, Kuwana (JP); Taemi Okuda, Kuwana (JP)

(73) Assignee: NTN Corporation, Osaka (JP)

( * ) Notice: Subject to any disclaimer, the term of this patent is extended or adjusted under 35 U.S.C. 154(b) by 11 days.

(21) Appl. No.: 12/451,562

(22) PCT Filed: May 19, 2008

(86) PCT No.: PCT/JP2008/059123
§ 371 (c)(1),
(2), (4) Date: Feb. 5, 2010

(87) PCT Pub. No.: WO2008/143210
PCT Pub. Date: Nov. 27, 2008

(65) Prior Publication Data
US 2010/0142872 A1 Jun. 10, 2010

(30) Foreign Application Priority Data

May 21, 2007 (JP) .............................. P2007-134718
May 21, 2007 (JP) .............................. P2007-134725
Aug. 29, 2007 (JP) .............................. P2007-222951

(51) Int. Cl.
*F16C 33/20* (2006.01)
*F16C 33/56* (2006.01)

(52) U.S. Cl.
CPC ............. *F16C 33/201* (2013.01); *F16C 33/565* (2013.01); *Y10S 384/907* (2013.01)
USPC ............ 384/573; 384/294; 384/492; 384/907

(58) Field of Classification Search
USPC ................... 74/294, 492, 527, 572, 569, 907, 74/456, 457, 462, 463; 508/108; 524/406, 524/420, 879; 384/294, 492, 527, 572, 907, 384/456, 457, 462, 463
See application file for complete search history.

(56) References Cited

U.S. PATENT DOCUMENTS

| | | | | |
|---|---|---|---|---|
| 3,608,054 A | * | 9/1971 | Alvino et al. .................. | 264/309 |
| 5,281,653 A | * | 1/1994 | Thomann et al. ............... | 524/490 |
| 5,288,555 A | * | 2/1994 | Monette et al. ............... | 428/375 |
| 5,486,299 A | | 1/1996 | Fuwa | |

(Continued)

FOREIGN PATENT DOCUMENTS

| JP | 07-097517 A | 4/1995 |
|---|---|---|
| JP | 280234 B2 | 7/1998 |

(Continued)

OTHER PUBLICATIONS

Machine Translation, JP 2005-299852.*

(Continued)

*Primary Examiner* — Thomas R Hannon
(74) *Attorney, Agent, or Firm* — Hedman & Costigan, P.C.; James V. Costigan

(57) ABSTRACT

A resin composition for a sliding member is difficult to peel and whose component is difficult to elute when the resin composition is formed as a film on a surface of a mechanical part, even though the resin composition is used in environment where the sliding member contacts lubricating oil containing a sulfur-based additive or in atmosphere containing a sulfur-based compound. A resin composition for a sliding member to be used for a mechanical part having a surface thereof formed of said sliding member. The resin composition contains polyamide-imide resin having an elongation percentage of 60% to 120%, fullerene, and at least one disulfide selected from among molybdenum disulfide and tungsten disulfide. 0.1 to 10 vol % of the fullerene and 0.5 to 20 vol % of the disulfide are contained in an entirety of the resin composition.

12 Claims, 8 Drawing Sheets

U.S. PATENT DOCUMENTS

| | | | |
|---|---|---|---|
| 5,737,976 A * | 4/1998 | Haman | 74/579 E |
| 6,419,981 B1 * | 7/2002 | Novich et al. | 427/180 |
| 6,548,453 B1 * | 4/2003 | Narasimhan et al. | 508/106 |
| 6,593,255 B1 * | 7/2003 | Lawton et al. | 442/59 |
| 7,021,042 B2 * | 4/2006 | Law | 60/226.1 |
| 8,119,240 B2 * | 2/2012 | Cooper | 428/408 |
| 2003/0144155 A1 | 7/2003 | Tenne | |
| 2010/0142872 A1 * | 6/2010 | Egami et al. | 384/462 |
| 2010/0233146 A1 * | 9/2010 | McDaniel | 424/94.2 |

FOREIGN PATENT DOCUMENTS

| | | |
|---|---|---|
| JP | 2002-195266 A | 7/2002 |
| JP | 2003-306604 A | 10/2003 |
| JP | 2005-089514 A | 4/2005 |
| JP | 2005-147306 A | 6/2005 |
| JP | 2005-299852 A | 10/2005 |
| JP | 2006-160799 A | 6/2006 |
| WO | WO92/04279 A1 | 3/1992 |
| WO | WO01/63986 A1 | 8/2001 |

OTHER PUBLICATIONS

PCT Search Report dated Jun. 15, 2011.
PCT Search Report dated Jul. 15, 2008.

* cited by examiner (a)　　　　　　　　(b)

Slid portion

Slid mark (wear)

RESIN COMPOSITION FOR SLIDING MEMBER AND ROLLING BEARING

TECHNICAL FIELD

The present invention relates to a resin composition for a sliding member to be used for a mechanical part whose surface is formed of the sliding member and a rolling bearing to be used in environment where the rolling bearing contacts lubricating oil containing a sulfur-based additive or to be used in atmosphere containing the sulfur-based compound.

BACKGROUND ART

The two-cycle engine has a piston making a linear reciprocating motion by combustion of a mixed gas, a crankshaft outputting a rotational motion, and a connecting rod connecting the piston and the crankshaft to each other to convert the linear reciprocating motion to a rotational motion.

The connecting rod has a large-end portion at a lower portion of a straight rod and a small-end portion at an upper portion thereof. The crankshaft and a piston pin coupling the piston and the connecting rod to each other are rotatably supported at the large-end portion of the connecting rod and at the small-end portion of the connecting rod respectively via roller bearings mounted on engaging holes respectively. The roller bearing supporting the rotational shaft is constructed of a plurality of rollers and a cage retaining the rollers.

The roller bearings, mounted on the engaging holes formed at the small-end portion of the connecting rod and the large-end portion thereof, which support the piston pin and the crankshaft respectively are capable of receiving a high load, although a projected area thereof is small. As the roller bearing, a needle roller bearing having a high rigidity is used. The needle roller bearing includes a plurality of needle rollers and a cage retaining a plurality of the needle rollers. The cage is provided with pockets for retaining the needle rollers respectively. A columnar portion positioned between the pockets retains the interval between the needle rollers. To decrease a load applied to the needle roller bearing owing to rotations of the needle rollers and rotations thereof on the center of the cage, the needle roller bearing disposed at the small-end portion of the connecting rod and the needle roller bearing disposed at the large-end portion thereof are used by guiding an outside-diameter surface of the cage, namely, by positively bringing the outside-diameter surface of the cage into contact with the inside-diameter surface of the engaging hole formed at the small-end portion of the connecting rod and the large-end portion thereof.

On the other hand, in the ordinary rolling bearing, the inside thereof is sealed with an inner ring, an outer ring, and a sealing member. The inside of the bearing is provided with rolling elements and a cage. Grease is filled inside the bearing. The rolling elements and the cage are always lubricated with the grease. On the other hand, because the above-described needle roller bearing is provided with none of the inner ring, the outer ring, and the sealing member, the inside of the bearing is not sealed, and the grease cannot be filled inside the bearing. Therefore when the needle roller bearing rotates, it is necessary to always supply lubricating oil to a sliding portion by a pump or the like.

Because the pump or the like starts to operate simultaneously with a start of the rotation of the needle roller bearing, the lubricating oil does not spread to the entire needle roller bearing immediately after the needle roller bearing starts to rotate. Thus a sufficient lubrication is not accomplished. Therefore friction is generated to a high extent between the cage and the needle roller. Thereby wear occurs on the surface of the cage and that of the needle roller, and on the outside-diameter surface of the cage and the inner-diameter surface of the housing of the bearing. In the worst case, there is a fear that both seize on each other.

Therefore to prevent wear and seizing which occur immediately after the needle roller bearing starts to rotate, an art of forming a film having lubricating property on the surface of the cage in advance is proposed.

For example, a method of forming a hard film of diamond-like carbon (hereinafter referred to as DLC) on the guide surface of the rolling elements of the cage made of the steel material having the hard layer formed on the surface thereof by a carburizing process by using a sputtering method and thereafter forming a film of a soft metal such as silver on the film of the DLC (see patent document 1) is known.

According to the description made in the patent document 1, the film of the soft metal decreases the friction between the cage and the needle roller and the friction between the outside-diameter surface of the cage and the inside-diameter surface of the housing. Therefore it is possible to prevent the seizing of the cage and the needle roller even at the time immediately after the start of the rotation although the lubrication is insufficient at this time. Further even though the film of the soft metal wears with its use, the DLC film disposed under the film of the soft metal is newly exposed and prevents the wear.

An art of directly forming the film of the soft metal on the surface of the cage by a plating method is proposed. For example, a method of forming a silver-plated film having a thickness of 25 to 50 μm on the surface of low carbon steel is known (see patent document 2). According to the description made in the patent document 2, the silver-plated film decreases the friction between the cage and the needle roller and the friction between the outside-diameter surface of the cage and the housing. Therefore as described above, the occurrence of seizing can be prevented even at the time immediately after the rotation starts in an insufficient lubrication. Similarly to the silver-plated film, the copper-plated film has an operation of decreasing the friction between the cage and the needle roller. Thus the copper-plated film is capable of preventing seizing.

But in the method described in the patent document 1, after the soft metal wears and disappears, the hard film is exposed, and the inside-diameter portion of the housing slides on the hard film. In this case, although the cage does not wear, there is a fear that the inside-diameter portion of the housing is worn by the hard film formed on the surface of the cage. From the standpoint of the production, because the carburizing processing is carried out on the cage, the DLC film is formed by a sputtering apparatus, and the soft metal film is formed, operation steps are complicated and many steps are required. Further the sputtering apparatus is expensive and provides an unfavorable production efficiency. Therefore the processing to be performed by using the sputtering apparatus costs high.

In the method described in the patent document 2, in the lubricating system containing the sulfur-based additive, the silver-plated film formed on the surface of the cage binds with the sulfur component contained in the lubricating oil to form silver sulfide. The silver sulfide coats the surface of the silver-plated film. Because the silver sulfide is more frail than silver, the film peels or is inferior in its oil resistance. Thus the film is dissolved in the lubricating oil. Consequently the friction between the outside-diameter surface of the cage from which the silver-plated film disappears and the inside-diameter surface of the housing increases and thus seizing is easy to occur. Similarly, copper sulfide is formed from the copper-plated film, which poses a problem that owing to the peeling and dissolution of the film, the lubricating property of the cage deteriorates.

The present inventors proposed a technique of forming a resin film containing fullerene on the surface of a cage (patent document 3). The resin containing the fullerene is capable of forming a lubricating film excellent in its wear resistance.

But the behavior of the wear-resistant lubricating film containing the fullerene in a lubricating system or atmosphere containing a sulfur-based additive is unknown.

Patent document 1: Japanese Patent Application Laid-Open No. 2005-147306

Patent document 2: Japanese Patent Application Laid-Open No. 2002-195266

Patent document 3: Japanese Patent Application Laid-Open No. 2005-299852

DISCLOSURE OF THE INVENTION

Problem to be Solved by the Invention

The present invention has been made to cope with the above-described problems. It is an object of the present invention to provide a resin composition, for a sliding member, which is difficult to peel and whose component is difficult to elute when the resin composition is formed as a film on a surface of a mechanical part, even though the resin composition is used in environment where the sliding member contacts lubricating oil containing a sulfur-based additive or in atmosphere containing a sulfur-based compound and provide a rolling bearing in which the film of the resin composition for the sliding member is used for a sliding surface.

Means for Solving the Problem

A resin composition of the present invention for a sliding member is used for a mechanical part in which at least a surface is formed of said sliding member. The composition containing synthetic resin, fullerene, and at least one disulfide selected from among molybdenum disulfide and tungsten disulfide. 0.1 to 10 vol % of said fullerene and 0.5 to 20 vol % of said disulfide are contained for an entirety of said resin composition.

The resin composition for a sliding member is used as a synthetic resin film. The synthetic resin is polyimide-based resin. The polyimide-based resin is polyamide-imide resin. The polyamide-imide resin has an elongation percentage of 60% to 120%.

A rolling bearing of the present invention has a plurality of rolling elements and a cage retaining said rolling elements. The rolling bearing is used in environment in which said rolling bearing contacts lubricating oil containing a sulfur-based additive or in atmosphere containing a sulfur-based compound. A film of the resin composition of the present invention is formed on a surface of said cage.

As the film of the resin composition for a sliding member, the polyamide-imide resin having an elongation percentage of 60% to 120% is used.

In the film of the resin composition for a sliding member, a first layer directly coating a sliding surface of said cage is a resin composition film of polyimide-based resin; and an outermost layer is made of a synthetic resin film not containing a filler or containing a solid lubricant.

The cage for use in the rolling bearing is a molding of an iron-based metal material. The rolling element is roller-shaped. The rolling bearing of the present invention supports a crankshaft outputting a rotational motion and is mounted on an engaging hole formed at a large-end portion of a connecting rod converting a linear reciprocating motion to a rotational motion.

Effect of the Invention

Because in the resin composition for a sliding member of the present invention, the predetermined amount of the fullerene and the disulfide are added to the synthetic resin, the fullerene in the form of fine particles and the disulfide in the form of powder are uniformly added to the resin or the film. Consequently owing to the synergistic effect, the wear resistance and peeling resistance of the resin composition are improved and the friction coefficient thereof lowers.

Because the polyamide-imide resin having the elongation percentage of 60% to 120% is used as the synthetic resin, the sliding portions of mechanical parts have a low extent of friction and neither wear nor peel occurs. Thus seizing is hardly generated, and a long life and a high reliability are obtained. In addition in the environment where the mechanical parts contacts the lubricating oil containing the sulfur-based additive, the cage is capable of maintaining its lubricating property for a long period of time. Thus the resin for the sliding member can be preferably utilized as a coating material coating the surface of the cage of the rolling bearing which is used in strict conditions, and particularly the surface of the cage of the rolling bearing for aircraft and a wind power generator, and the surface of the cage of a universal joint.

The rolling bearing of the present invention has a plurality of rolling elements and a cage retaining the rolling elements. The rolling bearing is used in the environment in which the rolling bearing contacts the lubricating oil containing the sulfur-based additive or the environment containing the sulfur-based compound. The film of the composition of the present invention for the sliding member is formed on the surface of the cage. Therefore it is possible to restrain the film from peeling and the component of the metal film from eluting in the lubricating oil. Thereby the film of the composition is capable of maintaining the lubricating property of the cage for a longer period of time than the plated metal conventionally used.

Because the rolling element is roller-shaped, the rolling bearing is capable of receiving a high load. Further by using the needle roller bearing having a high rigidity, the rolling bearing is capable of receiving a higher load.

The rolling bearing of the present invention is a roller bearing which supports the crankshaft outputting a rotational motion, is mounted on an engaging hole formed at a large-end portion of a connecting rod converting a linear reciprocating motion to a rotational motion and is a roller bearing guided by the outside-diameter surface of the cage, and is guided by an outside-diameter surface of the cage. Therefore the polyamide-imide resin film is capable of maintaining its lubricating property of the cage for a longer period of time than the plated metal conventionally used, and the wear of the outside-diameter surface of the cage and that of the inside-diameter surface of the engaging hole are prevented. Thereby the entire apparatus has a long life.

EXPLANATION OF REFERENCE NUMERALS AND SYMBOLS

Figure 1:
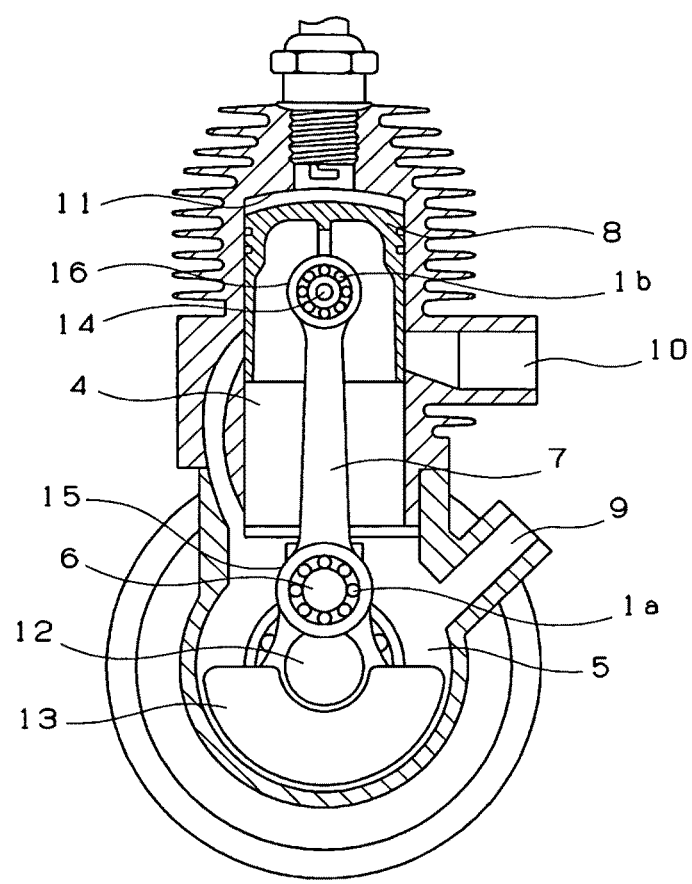
FIG. 1 is a vertical sectional view of a two-cycle engine in which a rolling bearing of the present invention is used.

1: needle roller bearing (rolling bearing)
1a: needle roller bearing
1b: needle roller bearing
2: cage
2a: pocket portion
3: needle roller (rolling element)
4: cylinder
5: crankcase
6: crankshaft
7: connecting rod
8: piston
9: inlet hole
10: exhaust hole
11: combustion chamber
12: rotational shaft
13: balance weight
14: piston pin
15: large-end portion
16: small-end portion
17: ring-shaped specimen
18: rotational shaft
19: arm portion
20: steel plate
21: air slider
22: load
23: load cell
24: felt pad
25: mechanical part
26: first layer
27: outermost layer
28: intermediate layer

BEST MODE FOR CARRYING OUT THE INVENTION

The synthetic resin which can be used for the composition of the present invention for a sliding member is not limited to a specific one, provided that it has resistance to oil, a high strength when the composition is formed into a film, and excellent wear resistance. As examples of such synthetic resin, it is possible to list thermosetting resin such as epoxy resin, phenol resin, polycarbodiimide resin, furan resin, bis-maleimide triazine resin, unsaturated polyester resin, silicone resin, polyaminobismaleimide resin, and aromatic polyimide resin; and thermoplastic resin such as polyolefin resin, polyacetal resin, polyamide resin, polyphenylene ether resin, polyphenylene sulfide resin, polysulfone resin, polyether sulfone resin, polyetherimide resin, thermoplastic polyimide resin, aromatic polyamide-imide resin, polybenzimidazole resin, polyether ketone resin, polyether nitrile resin, fluorine resin, and aromatic polyester resin. Of these synthetic resins, as preferable synthetic resins, the aromatic polyamide-imide resin, the aromatic polyimide resin, the epoxy resin, the phenol resin, the polyphenylene sulfide resin are listed. Various fillers fibrous and granular can be added to these synthetic resins as necessary.

In the present invention, especially preferable synthetic resin is polyimide-based resin excellent in its film-forming performance. As the polyimide-based resin, polyimide resin having imide bonds in its molecules and polyamide-imide resin having the imide bonds and amide bonds in its molecules are listed.

Of the polyimide-based resin, the aromatic polyimide resin is preferable. The aromatic polyimide resin has a repeating unit shown by a chemical formula 1. It is possible to use polyamic acid which is the precursor of the resin having the repeating unit shown by the chemical formula 1. $R_1$ is a residue group of aromatic tetracarboxylic acid or its derivatives. $R_2$ is a residue group of aromatic diamine or its derivatives. As the $R_1$ or $R_2$, phenyl group, naphthyl group, diphenyl group, and aromatic groups in which these groups are connected to each other with connecting groups such as methylene group, ether group, carbonyl group or sulfone group.

[Chemical formula 1]

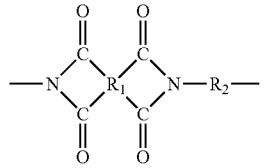

Listed as the aromatic tetracarboxylic acid or its derivatives are pyromellitic dianhydride, 2,2',3,3'-biphenyltetracarboxylic dianhydride, 3,3',4,4'-biphenyltetracarboxylic dianhydride, 3,3',4,4'-benzophenonetetracarboxylic dianhydride, 1,2,5,6-naphthalenetetracarboxylic dianhydride, bis(2,3-dicarboxyphenyl)methane dianhydride. These substances are used singly or as mixtures.

Listed as examples of the aromatic diamine or its derivatives are diamines such as 4,4'-diaminodiphenyl ether, 3,3'-diaminodiphenyl sulfone, 4,4'-diaminodiphenylmethane, methaphenylenediamine, paraphenylenediamine, and 4,4'-bis(3-aminophenoxy)biphenyl ether; and diisocyanates.

As examples of the aromatic polyimide resin to be obtained by the combination of the aromatic tetracarboxylic acid or its derivatives and the aromatic diamine or its derivatives, those having the repeating unit shown in table 1 are listed. These resins do not have heteroatoms in $R_1$ and $R_2$.

In the aromatic polyimide resin shown in table 1, polyimide C and polyimide D having a high ratio of the aromatic ring in the molecules thereof are preferable. The polyimide D is especially suitable in the present invention. As commercially available products of aromatic polyimide resin varnish, "U Varnish" produced by Ube Industries Ltd. is exemplified.

TABLE 1

| polyimide | Structural formula of repeating unit |
|---|---|
| A | 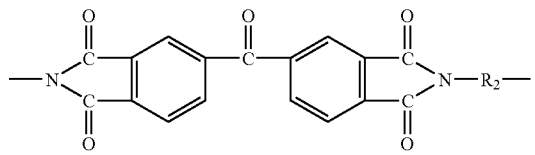 |
| B | 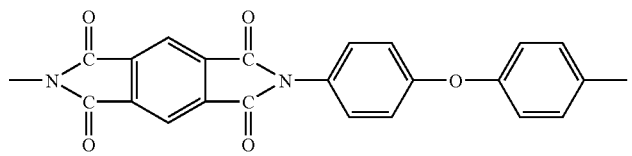 |
| C | 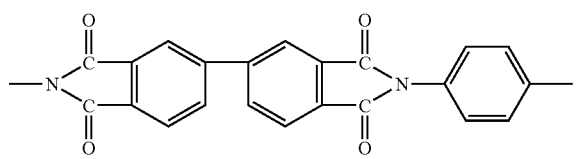 |
| D | 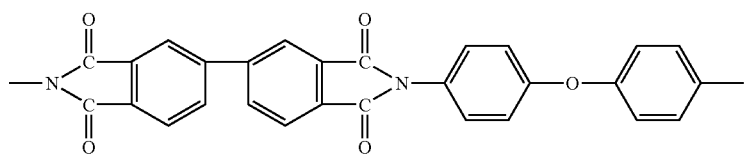 |
| E | 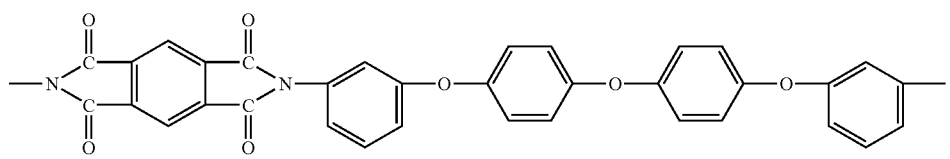 |

The polyamide-imide resin which can be used in the present invention has amide bonds and imide bonds in a high molecular main chain. The polyamide-imide resin can be obtained by a reaction between polycarboxylic acid or its derivative and diamine or its derivative.

As the polycarboxylic acid, dicarboxylic acid, tricarboxylic acid, and tetracarboxylic acid are listed. The polyamide-imide resin is obtained in combination of (1) the diamine and the dicarboxylic acid as well as the tricarboxylic acid, in combination of (2) the diamine and the dicarboxylic acid as well as the tetracarboxylic acid, in combination of (3) the tricarboxylic acid and the diamine, and in combination of (4) the diamine and the tricarboxylic acid as well as the tetracarboxylic acid. Derivatives of the polycarboxylic acid and the diamine may be used. As the derivatives of the polycarboxylic acid, anhydrides and acid chlorides are listed. As the derivative of the diamine, diisocyanate is exemplified. To avoid diisocyanate group from changing with the elapse of time, it is possible to use the diisocyanate stabilized with a blocking agent. As the blocking agent, alcohol, phenol, and oxime are listed.

As the polycarboxylic acid and the diamine, aromatic compounds and aliphatic compounds can be used. The polyamide-imide resin excellent in its elongation percentage can be preferably used in the present invention. It is preferable to use the aromatic compound and the aliphatic compound in combination.

The polyamide-imide resin can be modified with an epoxy compound.

Listed as examples of the tricarboxylic acid or its derivatives are trimellitic anhydride, 2,2',3-biphenyltricarboxylic anhydride, 3,3',4-biphenyltricarboxylic anhydride, 3,3',4-benzophenonetricarboxylic anhydride, 1,2,5-naphthalenetricarboxylic anhydride, and 2,3-dicarboxyphenylmethylbenzoic anhydride. These tricarboxylic acids are used singly or as mixtures.

The trimellitic anhydride is preferable because it is mass-produced and can be easily put into industrial use.

As examples of tetracarboxylic acid or derivatives thereof, it is possible to list pyromellitic acid dianhydride, 3,3',4,4'-benzophenonetetracarboxylic dianhydride, 3,3',4,4'-biphenyltetracarboxylic dianhydride, 1,2,5,6-naphthalenetetracarboxylic dianhydride, 2,3,5,6-pyridinetetracarboxylic dianhydride, 1,4,5,8-naphthalenetetracarboxylic dianhydride, 3,4,9,10-perylenetetracarboxylic dianhydride, 4,4'-sulfonyldiphthalic dianhydride, m-terphenyl-3,3',4,4'-tetracarboxylic dianhydride, 4,4'-oxydiphthalic dianhydride, 1,1,1,3,3,3-hexafluoro-2,2-bis(2,3- or 3,4-dicarboxyphenyl) propane dianhydride, 2,2-bis(2,3- or 3,4-dicarboxyphenyl) propane dianhydride, 2,2-bis[4-(2,3- or 3,4-dicarboxyphenoxy)phenyl]propane dianhydride, 1,1,1,3,3,3-hexafluoro-2,2-bis[4-(2,3- or 3,4-dicarboxyphenoxy)phenyl] propane dianhydride, 1,3-bis(3,4-dicarboxyphenyl)-1,1,3,3-tetramethyldisiloxane dianhydride, butanetetracarboxylic dianhydride, bicyclo-[2,2,2]-octo-7-ene-2:3:5:6-tetracarboxylic dianhydride.

Listed as the dicarboxylic acid are succinic acid, glutaric acid, adipic acid, azelaic acid, suberic acid, sebacic acid, decanoic diacid, dodecanoic diacid, dimer acid, isophthalic acid, terephthalic acid, phthalic acid, naphthalenedicarboxylic acid, oxydibenzoic acid, aliphatic dicarboxylic acid in which both terminals of polybutadiene-based oligomer consist of carboxyl group (Nisso-PB and C series produced by Nippon Soda Co., Ltd, Hycar-RLP and CT series produced by Ube Industries Co., Ltd., polymer series produced by Thiokol Corporation, Telagen series produced by General Tire Co., Ltd., Butaretz series produced by Phillips Petroleum Inc.), and ester dicarboxylic acid obtained by reacting dicarboxylic acid having a carboxyl equivalent weight not less than a hydroxyl equivalent weight.

As examples of the diamine and its derivative, the diisocyanates are exemplified. As the diisocyanates, 4,4'-diphenylmethane diisocyanate, tolylene diisocyanate, xylene diisocyanate, 4,4'-diphenyl ether diisocyanate, 4,4'-[2,2-bis(4-phenoxyphenyl)propane]diisocyanate, biphenyl-4,4'-diisocyanate, biphenyl-3,3'-diisocyanate, biphenyl-3,4'-diisocyanate, 3,3'-dimethylbiphenyl-4,4'-diisocyanate, 2,2'-dimethylbiphenyl-4,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, naphthalene-2,6-diisocyanate, hexamethylene diisocyanate, 2,2,4-trimethylhexamethylhexamethylene diisocyanate, isophorone diisocyanate, 4,4'-dicyclohexylmethane diisocyanate, transcyclohexane-1,4-diisocyanate, hydrogenated m-xylene diisocyanate, lysine diisocyanate, carbonate diols (commercial names: PLACCEL, CD-205, 205PL, 205HL, 210, 210PL, 210HL, 220, 220PL, 220HL produced by Daicel Chemical Co., Ltd.), and the diisocyanates such as urethane diisocyanate obtained by reacting diisocyanate having an isocyanate equivalent weight not less than a hydroxyl equivalent weight.

As the diamines, it is possible to list siloxanediamine in which amino groups are connected to both terminals of dimethylsiloxane (silicone oil X-22-161AS (amine equivalent weight: 450), X-22-161A (amine equivalent weight: 840), X-22-161B (amine equivalent weight: 1500), X-22-9409 (amine equivalent weight: 700), X-22-1660B-3 (amine equivalent weight: 2200) (these siloxanediamines are all produced by Shin-Etsu Chemical Co., Ltd., commercial name); BY16-853 (amine equivalent weight: 650), BY16-853B (amine equivalent weight: 2200) (these siloxanediamines are all produced by Toray Dow Corning Co., Ltd., commercial name); diamine having oligomer in which both terminals are aminated such as polyethylene in which both terminals are aminated, polypropylene in which both terminals are aminated, polymer in which both terminals are aminated or oxyalkylene group (Jefamin D series, Jefamin ED series, JefaminXTJ-511, JefaminXTJ-512, all produced by San Techno Chemical Co., Ltd.).

Different from the aromatic polyimide resin, the polyamide-imide resin which has the repeating unit of the amide bonds and the imide bonds in the state of a resin solution without undergoing the stage of the precursor is especially preferable in the present invention. It is also possible to use polyamide-imide resin modified with diisocyanate, BPDA, sulfone or rubber. As commercially available product of polyamide-imide resin varnish, HPC5020, HPC7200 produced by Hitachi Chemical Co., Ltd. are exemplified.

In the present invention, it is preferable that the resin film containing the polyamide-imide resin has an elongation percentage of 60% to 120%. When the elongation percentage is less than 60%, the resin film is inferior in its adhesiveness to the base material and hence easily peels therefrom. Therefore in the environment in which the resin film contacts the lubricating oil containing the sulfur-based additive, the peeling of the resin film from the metal base material or the elution of the component thereof easily occur. When the elongation percentage exceeds 120%, the resin film has a low heat resistance or easily swells in the lubricating oil. As commercially available products of the polyamide-imide resin composing the resin film having the elongation percentage of 60% to 120%, a product in the trade name of HPC7200-30 produced by Hitachi Chemical Co., Ltd. is exemplified.

In the present invention, the elongation percentage of the polyamide-imide resin film is measured by a method described below.

A polyamide-imide resin solution is applied to a glass substrate whose surface has been cleaned by blow of nitrogen gas after degreasing is carried out with acetone. Pre-drying is performed at 80° C. for 30 minutes and thereafter 150° C. for 10 minutes. Finally the polyamide-imide resin is dried for 30 minutes at a hardening temperature suitable for the molecular structure thereof. The hardened film is peeled off the glass substrate to obtain a resin film having a thickness of 80±8 μm. The film was formed as a long and narrow specimen having a size of 10 mm×60 mm. The elongation percentage (%) is measured by a tensile test machine by setting the distance between chucks to 20 mm, the tensile speed to 5 mm/minute, and temperature to room temperature.

The fullerene to be added to the polyimide-based resin consists of carbon molecules composed of five-membered rings and six-membered rings and has a diverse polyhedral structure spherically closed. The fullerene is a novel carbon material discovered by H. W. Kroto and R. E. Smalley in 1985 as a third carbon allotrope next to graphite and diamond. As representative molecular structures, $C_{70}$ having a so-called soccer ball-shaped structure constructing a spherical truncated regular icosahedron consisting of 12 five-membered rings and 20 six-membered rings. Similarly, $C_{70}$ consisting of 70 carbon atoms, higher order fullerene consisting of many carbon atoms, for example, $C_{76}$, $C_{78}$, $C_{82}$, $C_{89}$, $C_{90}$, $C_{94}$, and $C_{96}$ are present. Of these fullerenes, $C_{60}$ and $C_{70}$ are representative. By reacting these fullerenes, a multimer is obtained. In the present invention, both spherical fullerene and the multimer can be used.

As methods of producing the fullerene, a laser evaporation method, a resistance heating method, an arc discharge method, and a thermal decomposition method can be used. More specifically these methods are disclosed in U.S. Pat. No. 2,802,324 and the like. In these methods, carbon steam is generated in a decompressed state or in the presence of an inert gas, and thereafter the carbon steam is cooled to grow a cluster.

In recent years, as an economical and efficient mass production method, a combustion method has been put into practical use. In an example of the combustion method, an apparatus in which a burner is mounted in a decompression chamber is used. While the inside of the apparatus is being ventilated, a mixture of a hydrocarbon material and oxygen is supplied to the burner to generate flame. Thereafter a medium substance generated by the flame is collected by a collection apparatus disposed downstream. In this production method, the fullerene is obtained as a soluble matter in a solvent and isolated by solvent extraction or sublimation. The obtained fullerene is usually a mixture of $C_{60}$, $C_{70}$ and higher order fullerene. It is possible to isolate $C_{60}$ and $C_{70}$ by refinement. The construction and production method of the fullerene to be used in the present invention is not specifically limited, but the fullerene having carbon atoms almost equal to that of $C_{60}$ and $C_{70}$ in the number thereof or mixed fullerene of $C_{60}$ and $C_{70}$ is preferable.

The fullerene can be used as a solid mixing agent or as a mixing agent to be obtained by dissolving and dispersing the fullerene in an organic solvent. In both cases, it is possible to singly use the fullerene in the form of $C_{60}$, $C_{70}$ and the higher fullerene or in a mixed state. But from the standpoint of dispersibility thereof in the resin, it is preferable to use $C_{60}$, the $C_{70}$, and the higher fullerene in the mixed state. To make the dispersibility thereof more favorable, the average particle diameter thereof is not more than 100 μm, favorably not more than 50 μm, and most favorably not more than 10 μm.

The mixing ratio of the solid fullerene to the entire composition for the sliding member is 0.1 to 10 vol % and preferably 0.1 to 5 vol %. At less than 0.1 vol %, the composition is incapable of obtaining a sufficient wear resistance. At more than 10 vol %, defective dispersion occurs, and the composition has a low wear resistance.

As the molybdenum disulfide and the tungsten disulfide, they can be used in the form of powder. From the standpoint of the dispersibility thereof and surface smoothness of the film, the particle diameter is not more than 10 μm and preferably not more than 5 μm. The mixing ratio of the molybdenum disulfide and the tungsten disulfide to the entire composition for the sliding member is 0.5 to 20 vol % and preferably 0.5 to 15 vol %. At less than 0.1 vol %, the composition is incapable of obtaining a sufficient frictional wear resistance. At more than 20 vol %, the composition has a low wear resistance.

As a preferable form of the composition of the present invention for the sliding member, the resin composition contains the polyimide-based resin in which the fullerene and at least one disulfide selected from among the molybdenum disulfide and the tungsten disulfide are dispersed.

In the resin for the sliding member, it is preferable that as the polyimide-based resin, the polyamide-imide resin allowing the resin film to have the elongation percentage of 60% to 120% is preferable. It is possible that the film for the sliding member consists of the polyamide-imide resin. The polyamide-imide resin can be used as the resin composing the film of the first layer in forming the double-layer film on the surface of the cage.

In forming the double-layer film, the first layer directly coating the sliding surface of the sliding member is composed of the film consisting of the polyamide-imide resin having the elongation percentage of 60% to 120%. The outermost layer is made of a film of synthetic resin to which no filler is added or a film of synthetic resin to which a solid lubricant is added.

As the mixing ratio of the filler to the double-layer film, 0.1 to 20 vol % and preferably 0.5 to 10 vol % thereof is added to the entire film of each layer. At less than 0.1 vol %, the strength of the film is not sufficiently enhanced. Thus it is impossible to impart the film with peeling resistance. At more than 20 vol %, the film has a low adhesion. The filler herein means inorganic fine particles such as particles of fullerene, silicon carbide, silicon oxide, and the like. As the filler, powdery inorganic fine particles can be used. From the standpoint of dispersibility of the filler and the surface smoothness of the film, the particle diameter is not more than 10 μm and preferably not more than 5 μm.

In the present invention, the second layer of the double-layer film and layers subsequent thereto may contain the solid lubricant as necessary. As the solid lubricant, the molybdenum disulfide, the tungsten disulfide, the graphite, and PTFE resin are listed. It is possible to use these solid lubricants in the form of powder. From the standpoint of the dispersibility of the solid lubricant and the surface smoothness of the film, the particle diameter of the solid lubricant is not more than 10 μm and preferably not more than 5 μm. The mixing ratio of the solid lubricant to the entire double-layer film is 0.5 to 30 vol % and preferably 0.5 to 15 vol % thereof. At less than 0.1 vol %, it is impossible for the film to obtain a sufficient frictional wear property. At more than 30 vol %, the strength of the film is very low, and thus peeling or abnormal wear occurs.

Figure 7:
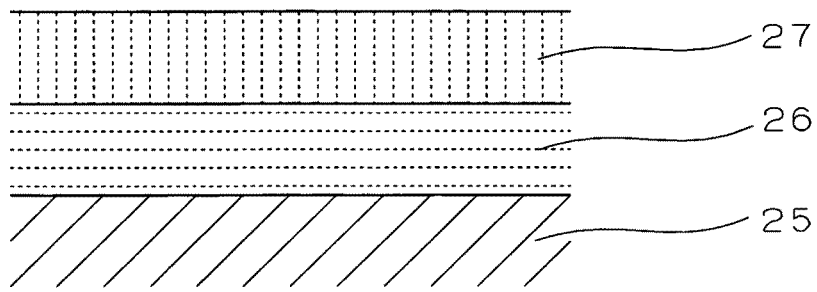
FIG. 7 is a diagram showing an example in which a double-layer film to be used in the present invention is composed of two layers.

The construction of the double-layer film to be used in the present invention is described below with reference to drawings. FIG. 7 is a diagram showing an example in which the double-layer film has two layers. As shown in FIG. 7, the double-layer film has two layers composed of a first layer 26 coating a mechanical part 25 and consisting of a synthetic resin film containing a filler and an outermost layer 27 coating the first layer 26 and consisting of a synthetic resin film containing a filler and a solid lubricant or containing only the solid lubricant.

Figure 8:
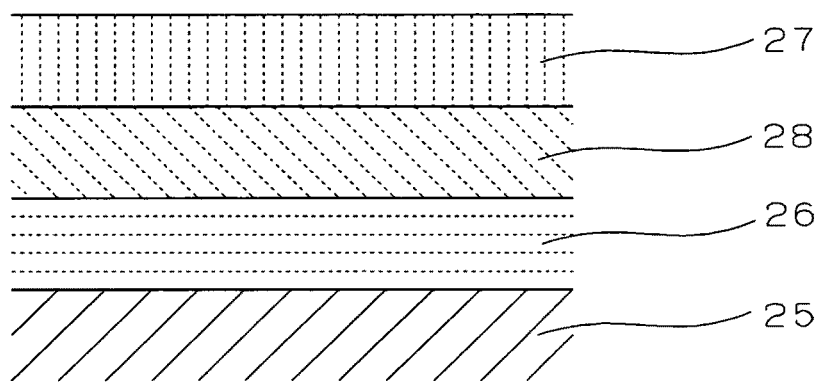
FIG. 8 is a diagram showing an example in which the double-layer film to be used in the present invention is composed of three layers.

FIG. 8 is a diagram showing an example in which the double-layer film has three layers. The double-layer film is not limited to two layers, but as shown in FIG. 8, for example, the double-layer film has the first layer 26 which coats the mechanical part 25 and an intermediate layer 28 containing a smaller amount of the solid lubricant than the outermost layer 27 may be formed between the first layer 26 and the outermost layer 27. It is possible to change the mixing amount of the solid lubricant.

Description is made below on a case in which the resin film to be obtained from the resin composition of the present invention or the double-layer film using the resin film is applied to the cage of the rolling bearing as the film which is difficult to elute in the environment where the rolling bearing contacts the lubricating oil containing the sulfur-based additive or in the atmosphere containing the sulfur-based compound.

As a result of energetic investigation of the rolling bearing, the polyimide-based resin excellent it its adhesiveness and heat resistance does not swell or dissolves when it is immersed in the lubricating oil containing the sulfur component. Therefore it has been found that even though a metal has a low sulfur resistance, metal elution into the lubricating oil hardly occurs by forming the film of the polyimide-based resin on the surface of the cage and the like. Therefore by producing a cage having the polyimide-based resin film formed on its surface and mounting the cage on the rolling bearing, it is possible to obtain the rolling bearing having a film which little elutes in the environment where the rolling bearing contacts the lubricating oil containing the sulfur component.

The use form of the rolling bearing of the present invention is described below with reference to the drawings. FIG. 1 is a vertical sectional view of a two-cycle engine using a needle rolling bearing as the rolling bearing of the present invention. As shown in FIG. 1, the two-cycle engine has a piston 8 making a linear reciprocating motion by the combustion of a mixed gas of gasoline and lubricating oil which is engine oil, a crankshaft 6 outputting a rotational motion, and a connecting rod 7 connecting the piston and the crankshaft 6 to each other to convert the linear reciprocating motion to the rotational motion. The crankshaft 6 rotates on a rotational shaft 12. A balance weight 13 takes balance in the rotation.

The connecting rod 7 has a large-end portion 15 at a lower portion of a straight rod and a small-end portion 16 at an upper portion thereof. The crankshaft 6 is rotatably supported via a needle roller bearing 1a mounted on an engaging hole of the large-end portion 15. A piston pin 14 coupling the piston 8 and the connecting rod 7 to each other is rotatably supported via a needle roller bearing 1b mounted on an engaging hole of the small-end portion 16.

After the mixed gas of the gasoline and the lubricating oil is fed from an inlet hole 9 to a crankcase 5, the mixed gas is introduced into a combustion chamber 11 disposed above a cylinder 4 according to a vertical motion of the piston 8 and burnt. A burnt exhaust gas is discharged from an exhaust hole 10.

Figure 2:
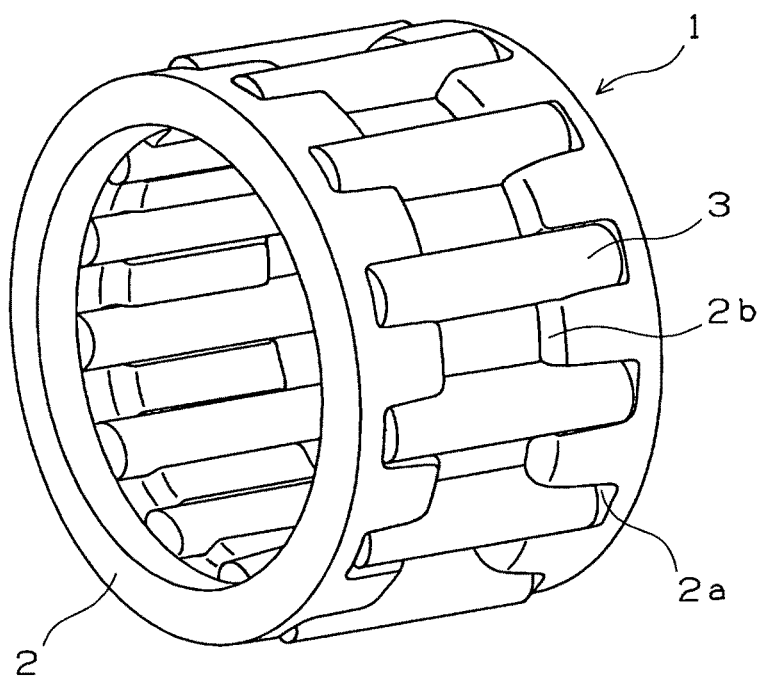
FIG. 2 is a perspective view showing a needle roller bearing which is one embodiment of the rolling bearing of the present invention.

FIG. 2 is a perspective view showing a needle roller bearing which is one embodiment of the rolling bearing of the present invention. As shown in FIG. 2, a needle roller bearing 1 is constructed of a plurality of needle rollers 3 and a cage 2 retaining the needle rollers 3 at regular or irregular intervals. The needle roller bearing is not provided with an inner ring nor an outer ring. The crankshaft 6 and the piston pin 14 are directly inserted into the inside-diameter side of the cage 2. The outside-diameter side of the cage 2 is fitted in the engaging hole, of the connecting rod 7, which is a housing (see FIG. 1). Because the needle roller bearing 1 does not have the inner ring nor the outer ring and the needle roller 3 having a small diameter relative to its length is used as a rolling element, the needle roller bearing 1 is smaller than ordinary rolling bearings having the inner and outer rings.

The cage 2 is provided with pockets 2a for holding the needle rollers 3 respectively. Each columnar portion 2b disposed between the pockets holds an interval between the needle rollers 3. The film of the polyimide-based resin is formed on the surface of the cage 2. The surface of the cage 2 on which the resin film for the sliding member is formed contacts the lubricating oil. It is preferable to form the film of the polyimide-based resin on the entire surface of the cage 2 including the surfaces of the pockets 2a which contact the needle rollers 3.

In addition to the surface of the cage 2, it is possible to form a similar resin film for the sliding member on the surface of the needle roller 3 which is a rolling element or the inside-diameter surface of the connecting rod 7.

Because the rolling element for use in the rolling bearing of the present invention is roller-shaped, the rolling bearing of the present invention is mounted on the engaging hole formed at the small-end portion of the connecting rod and the large-end portion thereof and is capable of supporting the piston and the crankshaft. Although the projected area of the bearing is small, the rolling bearing is capable of receiving a high load. Particularly the rolling bearing using the needle roller having a high rigidity as the rolling element thereof is capable of receiving a higher load than a rolling bearing using a roller as the rolling element thereof.

The rolling bearing of the present invention is the roller bearing which supports the crankshaft outputting the rotational motion, is mounted on the engaging hole formed at the large-end portion of the connecting rod converting the linear reciprocating motion to the rotational motion, and is used by guiding the outside-diameter surface of the cage having the above-described film. Therefore the film little peels and the metal little elutes in the lubricating oil. Thereby the film formed on the cage is capable of maintaining the lubricating property of the cage for a longer period of time than the conventional metal plating, and the friction between the outside-diameter surface of the cage and the inside-diameter surface of the engaging hole is prevented. Thereby the entire apparatus is allowed to have a long life.

As shown in FIG. 1, the rolling bearing of the present invention supports the piston pin outputting the linear reciprocating motion and can be mounted on the engaging hole formed at the small-end portion of the connecting rod converting the linear reciprocating motion to the rotational motion.

The rolling bearing of the present invention is applicable to the environment in which the rolling bearing contacts the lubricating oil containing the sulfur-based additive. As the environment in which the rolling bearing contacts the lubricating oil, as described above, it is possible to list a case in which the rolling bearing mounted on the two-cycle engine or a four-cycle engine contacts the mixed gas of the gasoline and the lubricating oil which is the engine oil or the engine oil and a case in which the rolling bearing contacts oil when the pockets of the cage thereof is lubricated.

The sulfur-based additive means an additive containing the sulfur-based compound. As the kind of the additive, an antioxidant, an anti-corrosive agent, an extreme-pressure agent, a detergent-dispersant, a metal deactivator, an anti-wear agent, and the like are listed.

As the lubricating oil to which the additive containing the sulfur-based compound is added, mineral oil, synthetic oil, ester oil, ether oil, and the like are listed.

As the sulfur-based compound, it is possible to list thiophosphate such as zinc dialkyl dithiophosphate (hereinafter referred to as ZnDTP) and zinc diallyl dithiophosphate, terpene sulfide, phenothiazine, mercaptobenzothiazole, oil sulfonate, alkylbenzene sulfonate, reaction-product salt of poly-butene-$P_2S_5$, ammonium salts of organic sulfonic acid, organic sulfonate of alkali earth metals, mercapto fatty acids such as 1-mercapto stearate and metal salts thereof, thiazoles such as 2,5-dimercapto-1,3,4-thiadiazole, 2-mercaptothiadiazole; disulfide compounds such as 2-(decyldithio)-benzimidazole, 2,5-bis(dodecyldithio)-benzimidazole; ester thiocarboxylic compounds such as dilauryl thiopropionate; sulfide grease such as dibenzyldisulfide, diphenyldisulfide, sulfidewave-dutyoil; ester sulfide such as olefin sulfide, fatty ester sulfide; sulfide such as dibenzyl disulfide, alkyl polysulfide, olefin polysulfide, and xanthic sulfide; calcium sulfonate; magnesium sulfonate, alkyldithiophosphateamine.

Of the above-described sulfur-based compounds, a compound easy to give influence on the roller bearing for the connecting rod is the ZnDTP.

In the present invention, "peeling or elution are difficult to occur in the environment in which the rolling bearing contacts the lubricating oil containing the sulfur-based additive" means that when three specimens each consisting of an SCM415 base material, having a dimension of 3 mm×3 mm×20 mm (surface area: 258 mm$^2$), on which the above-described metal film has been formed are immersed in 2.2 g of poly-α-olefin oil containing 1 wt % of the ZnDTP at 150° C. for 200 hours, the amount of the component of the metal films which has eluted in the lubricating oil from the specimens is not more than 200 ppm when the amount of the eluted component of the metal films is measured by an X-ray fluorescence measurement device.

The material to be used for the rolling bearing is not limited to a special one, but it is possible to use an iron-based metal material, a copper-based metal material, an aluminum-based metal material, and a resin material.

As the iron-based metal material, it is possible to use case-hardened steel (SCM), cold-rolled steel (SPCC), hot-rolled steel (PHC), carbon steel (S25C to S55C), stainless steel (SUS304 to SUS316), and mild steel (SS400).

Because the cage on which the resin film for the sliding member is formed by post-processing is used, it is possible to use bearing steel, carburized steel or carbon steel for machine structural use for the cage body. Of these steels, it is preferable to use the carburized steel which is heat-resistant and is rigid enough to withstand a high load. As the carburized steel, SCM415 is exemplified.

As the copper-based metal material, it is possible to use a copper-zinc alloy (HBsC1, HBsBE1, BSP1 through 3) and a copper-aluminum-iron alloy (AlBC1). As the aluminum-based metal material, it is possible to use an aluminum-silicon alloy (ADC12).

The resin material such as polyphenylene sulfide, polyether ether ketone can be used. It is possible to use the resin material containing glass fiber and carbon fiber therein as its reinforcing material.

In using the resin, for the sliding member, to be used in the present invention as the film of the cage of the rolling bearing, the film can be formed by a method described below. 59-2 Initially the cage which is the base material made of the iron-based metal material is sufficiently cleaned to remove pollutants present on the surface thereof. As the cleaning method, immersion cleaning to be performed by using an organic solvent, ultrasonic cleaning, steam cleaning, and acid/alkali cleaning are listed.

To improve the adhesiveness of the film, it is possible to perform shot blast (shot peening, WPC are included), chemical etching, and phosphate film treatment as pretreatment. The surface roughness Ra of the base material can be set in a range not less than 0.3 and preferably Ra=0.5 to 1.0. When Ra is less than 0.3, the film is incapable of obtaining a sufficient anchoring effect and thus incapable of improving its adhesiveness. On the other hand, when the surface roughness Ra of the base material is large, a finished surface is rough. But by making the surface roughness of the base material small by machining such as abrasion, it is possible to use the base material as the cage. When Ra=0.5 to 1.0, the film is capable of obtaining a sufficient adhesiveness, and the base material is capable of obtaining a small surface roughness without performing machining.

Thereafter the film of the resin for the sliding member is formed on the surface of the cage by a spray coating method, a dip (immersion) coating method, an electrostatic coating method, a tumbler coating method or an electro-deposition coating method. The thickness of the film is favorably 1 to 100 μm and more favorably 1 to 50 μm. In the film-forming step, the thickness of the film can be adjusted to a desired thickness by wiping an extra amount of varnish which has attached to the surface of the cage and removing it by physical and chemical methods such as centrifugation, air blow, and the like. 59-5 After the film is formed, solvent removal, drying, melting, and crosslinking are performed by heating treatment to complete the formation of the cage on which the film is formed. To increase the film thickness, lap coating may be performed. It is possible to perform machining and tumbler processing after the formation of the film is completed.

The rolling bearing of the present invention may have the form of both a radial bearing and a thrust bearing. The configuration of the rolling element is not limited to a specific one. But in the case of a roller configuration and a needle roller configuration, the effect of the present invention can be displayed to a higher extent. The roller configuration includes a cone roller configuration, a spherical roller configuration in addition to a cylindrical configuration.

The rolling bearing of the present invention can be preferably used for the above-described connecting rod, a compressor, and especially compressors for an air conditioner and a car air conditioner which are used in a thin lubricating condition.

The rolling bearing of the present invention can be also preferably used for aircraft, to support the main spindle of a wind power generator, and for a universal joint.

EXAMPLES

The materials used in examples 1 through 7 of the present invention and comparative examples 3 through 10 are collectively shown below. Abbreviations shown in [ ] are as shown in tables 2 and 3.
(1) Polyamide-imide resin varnish [PAI]
    HPC-5020-30 produced by Hitachi Chemical Co., Ltd., elongation percentage: 70%
(2) Aromatic polyimide resin varnish [PI]
    U Varnish-A produced by Ube Industries Ltd.
(3) Mixed fullerene [mixed fullerene]
    Mixed fullerene produced by Frontier Carbon Corporation, mixture of about 60 wt % of $C_{60}$ (diameter: 0.71 mm), about 25 wt % of $C_{70}$ (major axis diameter: 0.796 nm, minor axis diameter: 0.712 nm), and higher fullerene whose mixing ratio is the rest
(4) Molybdenum disulfide powder [$MoS_2$-0.5 μm]
    M5 produced by Molybdenum Co., Ltd. Japan, average particle diameter: 0.5 μm
(5) Tungsten disulfide powder [$Ws_2$-1 μm]
    WS2A produced by Lubricant Co., Japan, average particle diameter: 1 μm
(6) Polytetrafluoroethylene powder [PTFE-0.3 μm]
    KD-1000AS Dispersion (solvent: N-methyl-2-pyrrolidone (NMP)) produced by Kitamura Co., Ltd., average particle diameter: 0.3 μm
(7) Graphite powder [graphite-6 μm]
    KS-6 produced by Lonza Inc., average particle diameter: 6 μm Examples 1, 3 through 7 and Comparative Examples 3 through 10

Various fillers were added to the polyamide-imide resin varnish (solvent: NMP) at ratios to the solid content thereof shown in tables 2 and 3, and the components were mixed with one another with a ball mill till the fillers were sufficiently and uniformly dispersed in the polyamide-imide resin varnish. An outside surface of an SUJ2 ring [outer diameter of 40 mm×inner diameter of 20 mm×thickness of 10 mm (sub-curvature: R60), surface roughness Ra: 0.7 μm by shot blast, 17 of FIG. 3] to be used in a friction test was coated with the mixed solution by a spray method. The surface of each SPCC square rod (3 mm×3 mm×20 mm) was coated with the mixed solution by a dipping method to use it in a lubricating oil immersion test. After coating, each SUJ2 ring and each SPCC square rod were dried at 100° C. for one hour and then at 150° C. for one hour. Thereafter they were calcined at 250° C. for one hour. The number of sprays was adjusted to set the thickness of each film to 20 to 30 μm. A coating liquid containing the fullerene was prepared in advance by preparing a concentrated solution in which the fullerene was dissolved at a concentration of 5% in a mixed solvent (mixing weight ratio: 50:50) consisting toluene and N-methyl-2-pyrrolidone and adding the concentrated solution to the polyamide-imide resin varnish to set the concentration of each mixture to a predetermined concentration. The mixing ratios of the components shown in tables 2 and 3 are ratios as solid contents and shown by vol %.

<Sliding Test>

Figure 3:
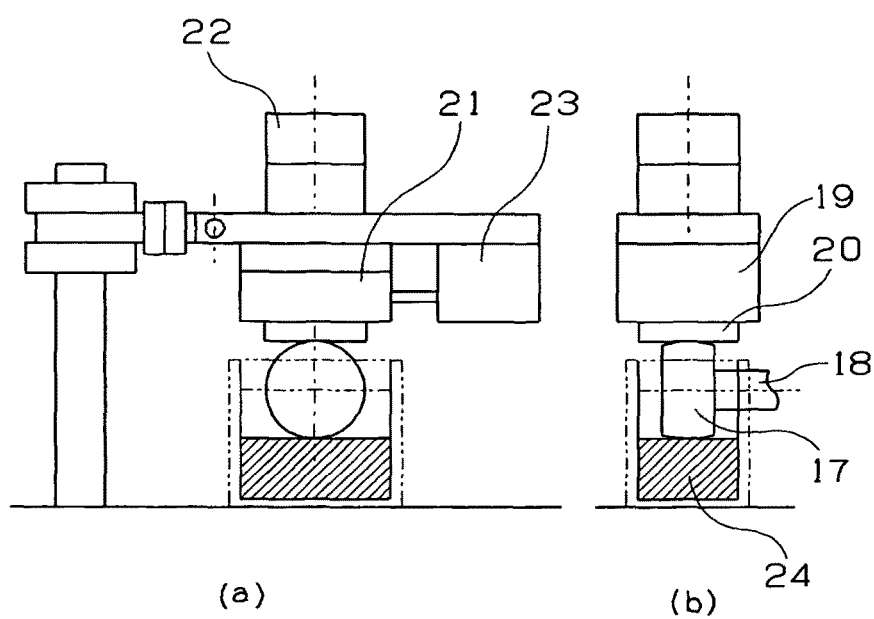
FIG. 3 shows a sliding tester.

A sliding tester (Sabang type frictional wear tester) shown in FIG. 3 was used.

A sliding test was conducted by using the obtained ring-shaped specimen. FIG. 3 shows the sliding tester. FIG. 3(*a*) and FIG. 3(*b*) show a front view and a side view respectively.

A ring-shaped specimen 17 is mounted on a rotational shaft 18, and a steel plate 20 is fixed to an air slider 21 of an arm portion 19. While a predetermined load 22 is being applied to the ring-shaped specimen 17 from an upper portion in FIG. 3, the ring-shaped specimen 17 contacts the steel plate 20 with the ring-shaped specimen 17 rotating. Lubricating oil is supplied to an outside-diameter surface of the ring-shaped specimen 17 from a felt pad 24 impregnated with the lubricating oil. A frictional force generated when the ring-shaped specimen 17 is rotated is detected by a load cell 23. After a predetermined period of time elapses, the state of the film formed on the outside-diameter surface of the ring-shaped specimen 17 is visually inspected. ◯: specimens not having outstanding wear nor outstanding peeling, ☐: specimens not having outstanding wear but having peeling, and X: specimens which ware to a high extent.

As the steel plate 20, a carburized steel SCM415 quenched and tempered (Hv 700, surface roughness Ra: 0.01 μm) was used. As the lubricating oil, Mobil Verocity Oil No. 3 (VG2 produced by Exxon Mobil Corporation) was used. The load was 50N. The sliding speed was 5.0 m/second. The test period of time was 30 minutes. The friction coefficient is indicated as an average of values measured for 10 minutes before the test finished. FIGS. 2 and 3 show results.

A lubricating oil immersion test was conducted on the obtained SPCC square rod. After three square rods on which the film was formed were immersed in 2.2 g of lubricating oil [1 wt % of the ZnDTP (LUBRIZOL677A produced by LUBRIZOL ENTERP INC.) was added to poly-α-olefin: LUCANT HL-10 produced by Mitsui Chemicals Inc.] having 150° C. for 200 hours, the amount of the component of the film which eluted in the lubricating oil was measured by using the X-ray fluorescence measurement device [Rigaku ZSX100e (produced by Rigaku Corporation)]. Tables 2 and 3 show results.

Example 2

Except that the fullerene was added to the aromatic polyimide resin varnish (solvent: N-methyl-2-pyrrolidone) at the ratio shown in table 2 and a calcining temperature after coating was set to 350° C., a specimen was prepared in a method similar to that of the example 1, and the specimen was evaluated in a manner similar to that of the example 1. Table 2 shows the result.

Comparative Example 1

A specimen similar to that of the example 1 was electroplated with copper (plated thickness: 5 μm) as a ground film. Thereafter the surface layer of the obtained specimen was electroplated with silver (plated thickness: 20 μm). The obtained specimen was evaluated in a manner similar to that of the example 1. Table 3 shows the result.

Comparative Example 2

A specimen similar to that of the example 1 was electroplated with copper (plated thickness: 25 μm). The obtained specimen was evaluated in a manner similar to that of the example 1. Table 3 shows the result.

TABLE 2

|  | Example | | | | | | |
| --- | --- | --- | --- | --- | --- | --- | --- |
|  | 1 | 2 | 3 | 4 | 5 | 6 | 7 |
| Composition (vol %) | | | | | | | |
| PAI | 89 | — | 89 | 98.5 | 98 | 84 | 98.9 |
| PI | — | 89 | — | — | — | — | — |
| Mixed fullerene | 1 | 1 | 1 | 0.5 | 1 | 1 | 0.1 |
| MoS$_2$-0.5 μm | 10 | 10 | — | 1 | 1 | 15 | 1 |
| WS$_2$-1 μm | — | — | 10 | — | — | — | — |
| PTFE-0.3 μm | — | — | — | — | — | — | — |
| Graphite-6 μm | — | — | — | — | — | — | — |
| Ag | — | — | — | — | — | — | — |
| Cu | — | — | — | — | — | — | — |
| Properties | | | | | | | |
| Friction coefficient | 0.02 | 0.05 | 0.03 | 0.04 | 0.03 | 0.04 | 0.04 |
| State of film after test finished | ◯ | ◯ | ◯ | ◯ | ◯ | ◯ | ◯ |
| Eluted elements and amount | Mo, Zero | Mo, Zero | W, Zero | Mo, Zero | Mo, Zero | Mo, Zero | Mo, Zero |

TABLE 3

|  | Comparative Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Composition (vol %) | | | | | | | | | | |
| PAI | — | — | 100 | 99 | 89 | 89 | 89.95 | 69 | 79 | 90 |
| PI | — | — | — | — | — | — | — | — | — | — |
| Mixed fullerene | — | — | — | 1 | 1 | 1 | 0.05 | 1 | 20 | — |
| MoS$_2$-0.5 μm | — | — | — | — | — | — | 10 | 30 | 1 | 10 |
| WS$_2$-1 μm | — | — | — | — | — | — | — | — | — | — |
| PTFE-0.3 μm | — | — | — | — | 10 | — | — | — | — | — |
| Graphite-6 μm | — | — | — | — | — | 10 | — | — | — | — |
| Ag | 100 | — | — | — | — | — | — | — | — | — |
| Cu | — | 100 | — | — | — | — | — | — | — | — |

TABLE 3-continued

| | Comparative Example | | | | | | | | | |
|---|---|---|---|---|---|---|---|---|---|---|
| | 1 | 2 | 3 | 4 | 5 | 6 | 7 | 8 | 9 | 10 |
| Properties | | | | | | | | | | |
| Friction coefficient | 0.03 | 0.08 | 0.05 | 0.08 | 0.03 | 0.03 | 0.04 | 0.04 | 0.07 | 0.03 |
| State of film after test finished | ○ | ○ | Δ | ○ | Δ | X | Δ | X | X | Δ |
| Eluted elements and amount | Ag, 0.06% | Cu, 0.35% | — | — | F, Zero | — | Mo, Zero | Mo, Zero | Mo, Zero | Mo, Zero |

Figure 4:
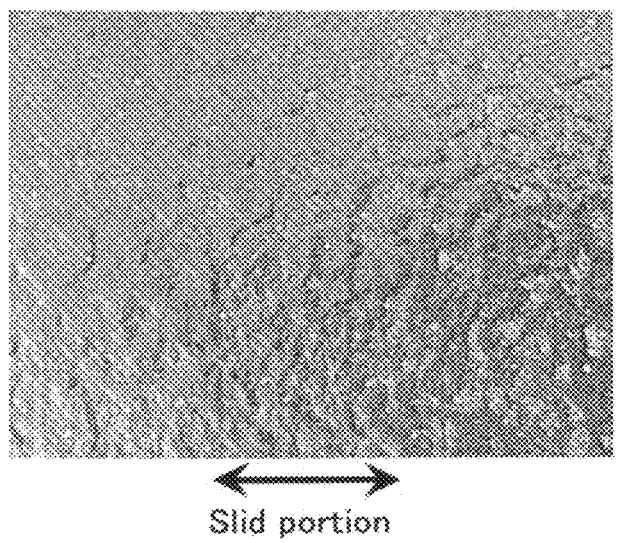
FIG. 4 shows a photograph of the surface of a ring taken after a sliding test finished in an example 5.
Figure 5:
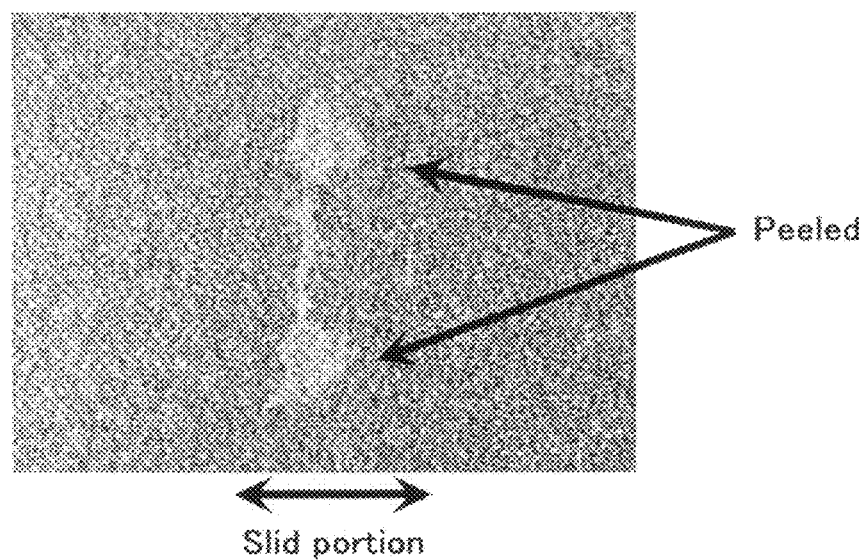
FIG. 5 shows a photograph of the surface of a ring taken after the sliding test finished in a comparative example 3.
Figure 6:
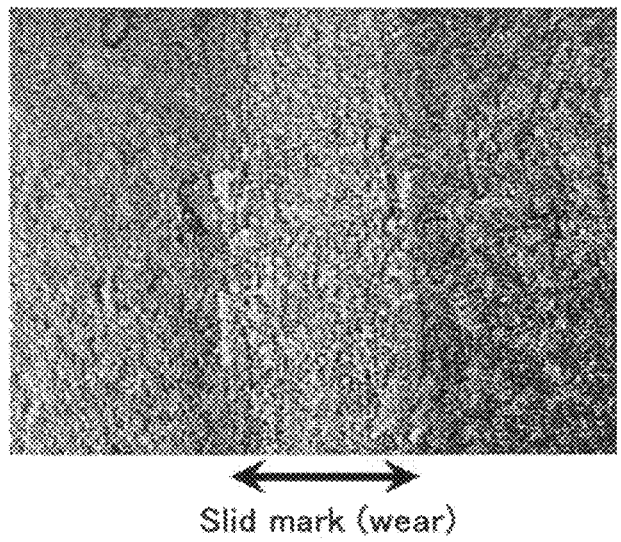
FIG. 6 shows a photograph of the surface of a ring taken after the sliding test finished in a comparative example 8.

FIG. 4 shows a photograph of the surface of the ring of the example 5 after the sliding test finished. FIG. 5 shows a photograph of the surface of the ring of the comparative example 3 after the sliding test finished. FIG. 6 shows a photograph of the surface of the ring of the comparative example 8 after the sliding test finished.

As apparent from the results shown in table 3, in the specimens of the comparative examples 1 and 2 which consisted of the plated metal conventionally used, a metal component eluted in the lubricating oil in the lubricating oil immersion test. Particularly much copper eluted at the time of copper plating. In the specimen of the comparative example 3 which consisted of the resin film not containing an additive, the friction coefficient was low, but peeling occurred in the friction test (see FIG. 5). In the specimen of the comparative example 4 which contained only the fullerene as its additive, although peeling did not occur during the friction test, the friction coefficient was higher than the specimen consisting of the resin. In the specimen of the comparative example 5 which contained the polytetrafluoroethylene in addition to the fullerene as its additive, although the friction coefficient was low, peeling occurred. The specimen of the comparative example 6 which contained the graphite wore greatly. Because the specimen of the comparative example 7 contained a small amount of the fullerene, the specimen was not improved in its peeling resistance. The specimens of the comparative examples 8 and 9 contained a larger amount of the fullerene or the molybdenum disulfide than the predetermined amount. Therefore they were dispersed unfavorably. In addition the amount of the resin component which was the binder was small. Thus the resin component was incapable of holding the additives, which caused an increase in the wear amount. In the comparative example 8, wear mark was found (see FIG. 6). The specimen of the comparative example 10 which contained only the molybdenum disulfide as its additive had almost the same property as that of the specimen consisting of the resin (comparative example 3).

On the other hand, the films of the examples 1 through 7 shown in table 2 were composed of the polyimide-based resin containing the predetermined amount of the fullerene and the molybdenum disulfide or the tungsten disulfide. Therefore the films had a low friction coefficient respectively. Thus neither peeling nor outstanding wear occurred during the friction test. A wear mark was not found on the surface of the ring of the example 5, and peeling did not occur thereon after the sliding test finished (see FIG. 4). In the specimen of the example 5, elution of the component of the film was not found in the lubricating oil immersion test.

Example 8

After the polyamide-imide resin varnish was applied to the peripheral surface of the SUJ ring having an outer diameter of 40 mm× an inner diameter of 20 mm× a thickness of 10 mm (subsidiary curvature: R60), the polyamide-imide resin varnish was dried to form a polyamide-imide resin film in a thickness of 20 to 30 μm. The polyamide-imide resin varnish used was HPC7200-30 having an elongation percentage of 101%. Predrying was performed at 80° C. for 30 minutes and thereafter at 150° C. for 10 minutes as film-forming conditions. At a last step, the polyamide-imide resin film was dried at 200° C. for 30 minutes. A sliding test shown below was conducted by using an obtained ring-shaped specimen. Table 4 shows the results.

<Sliding Test>

A sliding tester (Sabang type frictional wear tester), shown in FIG. 3, which was used in the example 1 was used. The test condition was similar to that of the example 1. Evaluation was made by visually measuring the number of portions where the film of the polyamide-imide resin formed on the peripheral surface of the ring-shaped specimen 17 peeled after the elapse of a predetermined period of time as the number of peeled points.

Comparative Example 11

As the polyamide-imide resin varnish, HPC4250-30 having an elongation percentage of 14% was used. As conditions in which a film was formed on the ring-shaped specimen, predrying was performed at 80° C. for 30 minutes and thereafter 150° C. for 10 minutes. Finally the polyamide-imide resin varnish was dried at 180° C. for 60 minutes to form the film of the polyamide-imide resin in a thickness of 20 to 30 μm. Except that the obtained ring-shaped specimen was used, a sliding test shown below was conducted in a manner similar to that of the example 8. Table 4 shows results.

Comparative Example 12

Except that HPC9000-21 having an elongation percentage of 10% was used as the polyamide-imide resin varnish, a film was formed in a manner similar to that of the comparative example 11 to conduct a sliding test in similar conditions. Table 4 shows the result.

TABLE 4

| | Example 8 | Comparative example 11 | Comparative example 12 |
|---|---|---|---|
| Elongation percentage (%) | 101 | 14 | 10 |
| Number of peeled points | 55 | 90 | 120 |
| Friction coefficient | 0.03 | 0.05 | 0.06 |

Because the polyamide-imide resin film (example 8) having a high elongation percentage had a smaller number of peeled points, i.e., had a small amount of damage on its sliding surface, it had a low friction coefficient. The polyamide-imide resin film (comparative examples 11 and 12) having a low elongation percentage had a larger number of peeled points. Therefore the sliding surfaces thereof were damaged and thus had a large surface roughness. Consequently the sliding surfaces thereof had a higher friction coefficient respectively than the sliding surface of the example 8.

Example 9

To evaluate the chemical stability of the polyamide-imide resin film, a lubricating oil immersion test was conducted.

A film containing the polyamide-imide resin (90 vol %) and $MoS_2$ (10 vol %) was formed on the entire surfaces of three SCM415 base materials to obtain specimens. The polyamide-imide resin varnish used was HPC7200-30 used in the example 8. Predrying was performed at 80° C. for 30 minutes and thereafter at 150° C. for 10 minutes as film-forming conditions to obtain a film having a thickness of 20 μm. As an element for detecting $MoS_2$ when the film elutes, Nichimori A Powder (commercial name) produced by Daiso Co., Ltd. was added to the polyamide-imide resin varnish. A lubricating oil immersion test was conducted on the specimen. The amount of the component of the film which eluted in the lubricating oil was measured. Table 5 shows results.
<Lubricating Oil Immersion Test>

After three specimens were immersed in 2.2 g of lubricating oil [poly-α-olefin: oil (Rukanto HL-10 produced by Mitsui Chemicals Inc.] containing 1 wt % of the ZnDTP (LUBRIZOL677A produced by LUBRIZOL ENTERP INC.) for 200 hours at 150° C., the amount of the component of the film which eluted from the specimens in the lubricating oil was measured by using the X-ray fluorescence measurement device [Rigaku ZSX100e (produced by Rigaku Corporation)].

Comparative Example 13

Three SCM415 base materials each having a dimension of 3 mm ×3 mm×20 mm (surface area: 258 $mm^2$) were copper-plated to form a copper film having a thickness of 30 μm thereon. In this manner, specimens were obtained. Similarly to the way of the measurement conducted in the example 9, measurement was done on the specimens. Table 5 shows the result.

Comparative Example 14

After three SCM415 base materials each having a dimension of 3 mm×3 mm×20 mm (surface area: 258 $mm^2$) were copper-plated to form a copper film having a thickness of 5 μm thereon as a ground film, they were silver-plated to form a silver film each having a thickness of 25 μm thereon. In this manner, specimens were obtained. Similarly to the way of the measurement conducted in the example 9, measurement was done on the specimens. Table 5 shows the result.

TABLE 5

|  | Example 9 | Comparative example 13 | Comparative example 14 |
| --- | --- | --- | --- |
| Detected element | Mo | Ag | Cu |
| Eluted amount, ppm | 0 | 600 | 3500 |

By using the polyamide-imide resin film, a film from which a metal did not elute and which was chemically stable was obtained. The results shown in tables 4 and 5 indicate that the polyamide-imide resin film having a high elongation percentage has peeling resistance and allows the cage to maintain lubricity for a long time.

Examples 10 through 17 are results of examples in which double-layer film was used.

Materials used in examples 10 through 17 and comparative examples 15 through 23 are collectively shown below. As the polyamide-imide resin varnish [PAI], the aromatic polyimide resin varnish [PI], the mixed fullerene, the molybdenum disulfide powder [$MoS_2$-0.5 μm], and the tungsten disulfide powder [$WS_2$-1 μm], the same materials as those used in the examples 1 through 7 were used. Other materials are as shown below. Abbreviations shown above are as shown in table 6.
(1) Silicon carbide [SiC]
Reagent produced by Soegawa Physical and Chemical Co., Ltd., average diameter: 1 μm
(2) Silicon oxide [$SiO_2$]
Admafine SO-C5 produced by Admatechs Ltd., average diameter: 1.6 μm Examples 10 through 13, 15 through 17 and Comparative Example 23

Various fillers were added to the polyamide-imide resin varnish (solvent: NMP) at ratios to the solid content thereof shown in table 6, and the components were mixed with one another with the ball mill till the fillers were sufficiently and uniformly dispersed in the polyamide-imide resin varnish. An outside surface of each SUJ2 ring [outer diameter of 40 mm×inner diameter of 20 mm×thickness of 10 mm (subsidiary curvature: R60), surface roughness Ra: 0.7 μm by shot blast, 17 of FIG. 3] to be used in the friction test was coated with the mixed solution by the spray method to form a film composed of two layers. The surface of each SPCC square rod (3 mm×3 mm×20 mm) was coated with the mixed solution by the dipping method to form a film composed of two layers so that it is used in the lubricating oil immersion test.

After the first layer of each of the specimens was coated, they were dried at 100° C. for one hour. Thereafter the first layer was coated with a second layer. After the second layer was dried at 100° C. for one hour and then at 150° C. for one hour, each specimen was calcined at 250° C. for one hour. The mixing ratios of the components shown in table 6 are ratios as solid contents and shown by vol %. The film was formed on each specimen by setting the thickness of the first layer to 20 μm and that of the second layer to 10 μm.

A coating liquid containing the fullerene was prepared in advance by preparing a concentrated solution in which the fullerene was dissolved at a concentration of 5% in a mixed solvent (mixing weight ratio: 50:50) consisting the toluene and the NMP and adding the concentrated solution to the polyamide-imide resin varnish to set the concentration of each mixture to a predetermined concentration.

By the above-described processing, ring-shaped specimen and square rod-shaped specimens were obtained. A friction test shown below was conducted on the obtained ring-shaped specimen to evaluate the friction coefficient and the state of the film after the test finished. A lubricating oil immersion test shown below was conducted on the obtained square rod-shaped specimen to measure the concentration of the component of the film which eluted in the lubricating oil. Table 6 shows the result.
<Friction Test>

Using a sliding tester (Sabang type frictional wear tester), shown in FIG. 3, which was used in the example 1, a friction test was conducted in conditions similar to those of the examples. The friction coefficient was indicated as an average value during 10 minutes before the test finished.

<Lubricating Oil Immersion Test>

A lubricating oil immersion test was conducted on the obtained square rod-shaped specimens. After three specimens on which a film was formed were immersed in 2.2 g of lubricating oil [1 wt % of the ZnDTP (LUBRIZOL677A produced by LUBRIZOL ENTERP INC.) was added to poly-α-olefin: LUCANT HL-10 produced by Mitsui Chemicals Inc.] for 200 hours at 150° C., the amount of the component of the film which eluted from the specimens in the lubricating oil was measured by using the X-ray fluorescence measurement device (Rigaku ZSX100e produced by Rigaku Corporation).

Example 14

Two Resin Layers

A specimen was formed in a manner similar to that of the example 10 except that as a first layer, a base material was coated with a film composed of the aromatic polyimide resin varnish (solvent: NMP) and the fullerene contained at the ratio shown in table 6, that as a second layer, the first layer was coated with a film composed of the aromatic polyimide resin varnish and the molybdenum disulfide, and that the calcining temperature after coating was set to 350° C. Evaluation was made in a manner similar to that of the example 10. Table 6 shows the result.

Comparative Example 15

Two Plated Layers

Unlike the example 10, instead of forming the film on the specimen, the specimen was electroplated with copper (plated thickness: 5 μm) as a ground film. As a second layer, silver-plated (plated thickness: 20 μm) layer was formed to obtain a ring-shaped specimen and a square rod-shaped specimen. The obtained ring-shaped and square rod-shaped specimens were evaluated in a manner similar to that of the example 10. Table 6 shows the result.

Comparative Example 16

One Plated Layer

Unlike the example 10, instead of forming the film on the specimen, the specimen was electroplated with copper (plated thickness: 25 μm) to obtain a ring-shaped specimen and a square rod-shaped specimen. The obtained ring-shaped and square rod-shaped specimens were evaluated in a manner similar to that of the example 10. Table 6 shows the result.

Comparative Examples 17 through 22

Only One Resin Layer

Various fillers were added to the polyamide-imide resin varnish (solvent: NMP) at ratios to the solid content thereof shown in table 6, and the components were mixed with one another with the ball mill till the fillers were sufficiently and uniformly dispersed in the polyamide-imide resin varnish. An outside surface of each SUJ2 ring [outer diameter of 40 mm×inner diameter of 20 mm×thickness of 10 mm (subsidiary curvature: R60), surface roughness Ra: 0.7 μm by shot blast, 17 of FIG. 3] to be used in the friction test was coated with the mixed solution by the spray method. The surface of each SPCC square rod (3 mm×3 mm×20 mm) was coated with the mixed solution by the dipping method to use it in the lubricating oil immersion test. After coating, each SUJ2 ring and each SPCC square rod were dried at 100° C. for one hour and then at 150° C. for one hour. Thereafter they were calcined at 250° C. for one hour. The number of sprays was adjusted to set the thickness of each film to 20 to 30 μm.

A coating liquid containing the fullerene was prepared in advance by preparing a concentrated solution in which the fullerene was dissolved at a concentration of 5% in a mixed solvent (mixing weight ratio: 50:50) consisting the toluene and the NMP and adding the concentrated solution to the polyamide-imide resin varnish to set the concentration of each mixture to a predetermined concentration.

By the above-described processing, ring-shaped and square rod-shaped specimens were obtained. The obtained ring-shaped and square rod-shaped specimens were evaluated in a manner similar to that of the example 10. Table 6 shows the result.

TABLE 6

| | Example | | | | | | | | Comparative example |
|---|---|---|---|---|---|---|---|---|---|
| | 10 | 11 | 12 | 13 | 14 | 15 | 16 | 17 | 15 |
| Composition of film (vol %) First layer | | | | | | | | | |
| PAI | 99 | 90 | 99 | 99 | — | 99 | 99 | 90 | — |
| PI | — | — | — | — | 99 | — | — | — | — |
| Mixed fullerene | 1 | — | 1 | 1 | 1 | 1 | 1 | — | — |
| SiC | — | 10 | — | — | — | — | — | — | — |
| $SiO_2$ | — | — | — | — | — | — | — | 10 | — |
| $MOS_2$-0.5 μm | — | — | — | — | — | — | — | — | — |
| Outermost layer (single-layer film is included) | | | | | | | | | |
| PAI | 80 | 80 | 80 | 80 | — | 100 | 79 | 80 | — |
| PI | — | — | — | — | 80 | — | — | — | — |
| Mixed fullerene | — | — | — | — | — | — | 1 | — | — |
| SiC | — | — | — | — | — | — | — | — | — |
| $MOS_2$-0.5 μm | 20 | 20 | — | — | 20 | — | 20 | 20 | — |
| $WS_2$-1 μm | — | — | 20 | — | — | — | — | — | — |
| PTFE-0.3 μm | — | — | — | 20 | — | — | — | — | — |
| Ag-20 μm (lower layer Cu-5 μm) | — | — | — | — | — | — | — | — | 100 |
| Cu-20 μm | — | — | — | — | — | — | — | — | — |

TABLE 6-continued

| Properties | | | | | | | | | |
|---|---|---|---|---|---|---|---|---|---|
| Friction coefficient | 0.03 | 0.03 | 0.03 | 0.04 | 0.03 | 0.05 | 0.03 | 0.03 | 0.03 |
| State of film after test finished | ○ | ○ | ○ | ○ | ○ | ○ | ○ | ○ | ○ |
| Confirmed eluted elements | Mo | Mo | W | F | Mo | — | Mo | Mo | Ag |
| Eluted amount (vol %) | Zero | Zero | Zero | Zero | Zero | — | Zero | Zero | 0.06 |

| | Comparative example | | | | | | | |
|---|---|---|---|---|---|---|---|---|
| | 16 | 17 | 18 | 19 | 20 | 21 | 22 | 23 |
| Composition of film (vol %) First layer | | | | | | | | |
| PAI | — | — | — | — | — | — | — | 80 |
| PI | — | — | — | — | — | — | — | — |
| Mixed fullerene | — | — | — | — | — | — | — | — |
| SiC | — | — | — | — | — | — | — | — |
| SiO$_2$ | — | — | — | — | — | — | — | — |
| MOS$_2$-0.5 μm | — | — | — | — | — | — | — | 20 |
| Outermost layer (single-layer film is included) | | | | | | | | |
| PAI | — | 100 | 99 | 80 | 80 | 80 | 90 | 99 |
| PI | — | — | — | — | — | — | — | — |
| Mixed fullerene | — | — | 1 | — | — | — | — | 1 |
| SiC | — | — | — | — | — | — | 10 | — |
| MOS$_2$-0.5 μm | — | — | — | 20 | — | — | — | — |
| WS$_2$-1 μm | — | — | — | — | 20 | — | — | — |
| PTFE-0.3 μm | — | — | — | — | — | 20 | — | — |
| Ag-20 μm (lower layer Cu-5 μm) | — | — | — | — | — | — | — | — |
| Cu-20 μm | 100 | — | — | — | — | — | — | — |
| Properties | | | | | | | | |
| Friction coefficient | 0.08 | 0.05 | 0.08 | 0.03 | 0.03 | 0.04 | 0.06 | 0.08 |
| State of film after test finished | ○ | Δ | ○ | Δ | Δ | Δ | ○ | Δ |
| Confirmed eluted elements | Cu | — | — | Mo | W | F | Si | — |
| Eluted amount (vol %) | 0.35 | — | — | zero | zero | zero | zero | — |

As apparent from the results shown in table 6, in the specimens of the comparative examples 15 and 16 in which metal plating was performed as conventionally done, the metal component eluted in the lubricating oil in the lubricating oil immersion test. In the specimen of the comparative example 16, much plated copper eluted. In the specimens of the comparative examples 17 and 19 through 21 in which the resin film not containing the layer reinforced with a filler was formed, elution into the lubricating oil did not occur, and the friction coefficient was low, but peeling occurred during the friction test. In the specimen of the comparative example 18 (only fullerene) in which the resin film consisting of the layer reinforced with the filler was formed, although peeling did not occur during the friction test, the friction coefficient was higher than the specimen consisting of the resin (comparative example 17). The specimen of the comparative example 22 (only SiC) was high in its property of attacking the mating material. Thus the mating material wore greatly. In the specimen of the comparative example 23, peeling occurred in the first layer containing MoS$_2$. Because the second layer contained the fullerene, similarly to the comparative example 18, the friction coefficient was high.

On the other hand, in the specimens of the examples 10 through 17 in which the first layer was reinforced with the filler, neither peeling nor elution into the lubricating oil occurred in the lubricating oil immersion test. Further owing to the presence of the second layer, the specimens had a low friction coefficient respectively and excellent familiarity.

Industrial Applicability

Because the film of the polyimide-based resin containing the fullerene and the molybdenum disulfide or the tungsten disulfide is formed on the surface of the cage of the rolling bearing, a small amount of friction is generated by the contact between the cage and the bearing ring and neither wear nor peeling occurs. Thus seizing is hardly generated, and a long life and a high reliability are obtained. In addition in the environment where the rolling bearing contacts the lubricating oil containing the sulfur-based additive, the resin for the sliding member is capable of maintaining the lubricating property for a long period of time. Thus the resin for the sliding member can be preferably utilized for the cage of the rolling bearing in strict conditions.

The invention claimed is:

1. A resin composition, for a sliding member, to be used for a mechanical part in which at least a surface is formed of said sliding member,
    said composition comprising synthetic resin, fullerene, and at least one disulfide selected from among molybdenum disulfide and tungsten disulfide,
    wherein 0.1 to 10 vol % of said fullerene and 0.5 to 20 vol % of said disulfide are contained for an entirety of said resin composition.

2. The resin composition for a sliding member according to claim 1, wherein said sliding member formed on said surface is a synthetic resin film.

3. The resin composition for a sliding member according to claim 1 or 2, wherein said synthetic resin is polyimide-based resin.

4. The resin composition for a sliding member according to claim 3, wherein said polyimide-based resin is polyamide-imide resin.

5. The resin composition for a sliding member according to claim 4, wherein said polyamide-imide resin has an elongation percentage of 60% to 120%.

6. The resin composition for a sliding member according to claim 1, wherein said resin composition has the following property: when three specimens each consisting of an SCM415 base material, having a dimension of 3 mm×3 mm×20 mm (surface area 258 mm$^2$), on which a film of said resin composition has been formed are immersed in 2.2 g of poly-α-olefin oil containing 1 wt % of zinc dialkyl dithiophosphate at 150° C. for 200 hours, an amount of a component of said film of said resin composition which has eluted in said oil from said specimens is not more than 200 ppm when said amount of said eluted component of said film of said resin composition is measured by an x-ray fluorescence measurement device.

7. The resin composition, for a sliding member, according to claim 1 wherein 0.1 to 5 vol % of said fullerene and 0.5 to 15 vol % of said disulfide are contained for an entirety of said resin composition.

8. A rolling bearing, comprising a plurality of rolling elements and a cage retaining said rolling elements, which is used in environment in which said rolling bearing contacts lubricating oil containing a sulfur-based additive or in atmosphere containing a sulfur-based compound,
wherein a film of a resin composition for a sliding member according to claim 1 is formed on a surface of said cage.

9. The rolling bearing according to claim 8, wherein said cage is a molding of an iron-based metal material.

10. The rolling bearing according to claim 8, wherein said rolling element is roller-shaped.

11. The rolling bearing according to claim 10, wherein said roller-shaped rolling element is needle roller-shaped.

12. The rolling bearing according to claim 8, which supports a crankshaft outputting a rotational motion and is mounted on an engaging hole formed at a large-end portion of a connecting rod converting a linear reciprocating motion to a rotational motion.

* * * * *